United States Patent [19]

Schmitt

[11] 4,282,989

[45] Aug. 11, 1981

[54] DEVICE WITH A CONICALLY SHAPED HOUSING AND FEELING FOR FEEDING PLASTICS MATERIAL TO AN EXTRUDER

[75] Inventor: Bernhard Schmitt, Lüdinghausen, Fed. Rep. of Germany

[73] Assignee: Joachim Kreyenborg & Co., Münster-Kinderhaus, Fed. Rep. of Germany

[21] Appl. No.: 90,646

[22] Filed: Nov. 2, 1979

[30] Foreign Application Priority Data

Nov. 2, 1978 [DE] Fed. Rep. of Germany ....... 2847494

[51] Int. Cl.³ .......................................... B65D 88/54
[52] U.S. Cl. .................................. 222/316; 222/317; 222/413; 366/89; 366/186; 366/193
[58] Field of Search .............. 222/239, 240, 241, 242, 222/290, 310, 311, 316, 317, 413, 485, 486; 366/186, 193, 89; 241/260.1; 425/376 B; 198/558, 670, 671; 414/326; 415/72

[56] References Cited

U.S. PATENT DOCUMENTS

| | | | |
|---|---|---|---|
| 1,192,250 | 7/1916 | Weyant | 222/413 |
| 2,101,490 | 12/1937 | Bullock et al. | 366/193 |
| 3,452,865 | 7/1969 | Echardt | 222/413 X |
| 4,151,932 | 5/1979 | Wachtler | 222/241 X |
| 4,177,940 | 12/1979 | McHugh | 222/240 X |

FOREIGN PATENT DOCUMENTS 1484872 9/1977 United Kingdom.

Primary Examiner—Robert J. Spar
Assistant Examiner—Fred A. Silverberg
Attorney, Agent, or Firm—Toren, McGeady and Stanger

[57] ABSTRACT

A device for feeding or pressing plastics material to an extruder includes a conically shaped housing with its apex directed downwardly and with a similarly conically shaped feeding member within the housing. The outer surface of the feeding member is parallel to and spaced inwardly from the inner surface of the housing. A screw blade is secured to and extends helically around the outer surface of the feed member. A partition wall divides the interior of the housing into an upper storage chamber and a lower material conveying chamber. The partition wall is constructed to provide variable openings for admitting material from the storage chamber into the conveying chamber.

4 Claims, 2 Drawing Figures

DEVICE WITH A CONICALLY SHAPED HOUSING AND FEELING FOR FEEDING PLASTICS MATERIAL TO AN EXTRUDER

SUMMARY OF THE INVENTION

The invention is directed to a feeding or pressing device for supplying plastics material to an extruder. The device includes a conically shaped housing containing a similarly conically shaped feeding or pressing screw. The screw has a wall which extends in parallel relation with the inner surface of the housing and the screw blade is secured on this wall.

Devices of this general type provided with feeding or pressing screws are known from British Pat. No. 1,484,872 in which the screw is driven via a geared motor. In this device, the pressing screw can rotate clockwise or counterclockwise and is replaceable so that the shape of the screw can be changed depending on the plastics material to be fed and the screw can be adjusted to the material. Devices of this type serve to precompress and continuously supply foil chips, pulverized ground material, agglomerates and mixed material as well as fibers. This pressing device is connected to an extruder and provides a continuous supply of the required material to the extruder so that a constant output from the extruder is obtained. The processing of different materials, and particularly the processing of foil chips, is extremely complicated and requires the installation, after certain test runs for a change in material, of a screw which is constructed in accordance with the material to be fed. Obviously such operations are time consuming and, as a result, expensive. Unfortunately, it has been found, even after an optimum adjustment of the geometry of the screw has been effected relative to the material to be processed, that an output efficiency of only 40% can be achieved.

Therefore, it is the primary object of the present invention to provide a feeding or pressing device with a feeding or pressing screw which, independently of the material to be processed, always ensures a uniform supply of the material to the extruder.

In accordance with the present invention, the feeding or pressing member includes a wall on which the screw blade is secured. The wall with the screw blade is arranged within a conically shaped housing and above the screw blade the wall has the shape of an inverted funnel.

To prevent an overload on the extruder or an overload in the conveying space in the housing, in accordance with another feature of the invention, the interior of the housing is divided into an upper storage portion and a lower conveying portion by the combination of the upper part of the feeding screw and a partition wall. The partition wall is provided with dosing or metering openings for admitting material from the storage portion or chamber into the conveying portion or chamber. These openings are adjustable so that a continuous supply of the material into the conveying space is ensured by the selection of the size of the openings. The partition wall containing the dosing openings can be easily manufactured from an adjustable frusto-conically shaped member with attached spaced segments. The frusto-conical member has openings which can be rotated relative to the openings formed by the segments with the openings being at least partially in alignment so that the size of the flow path through the frusto-conical member can be regulated.

Surprisingly, it has been found that the simple arrangement embodied in the present invention provides a solution for a problem which has been experienced for a long time in these particular devices.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
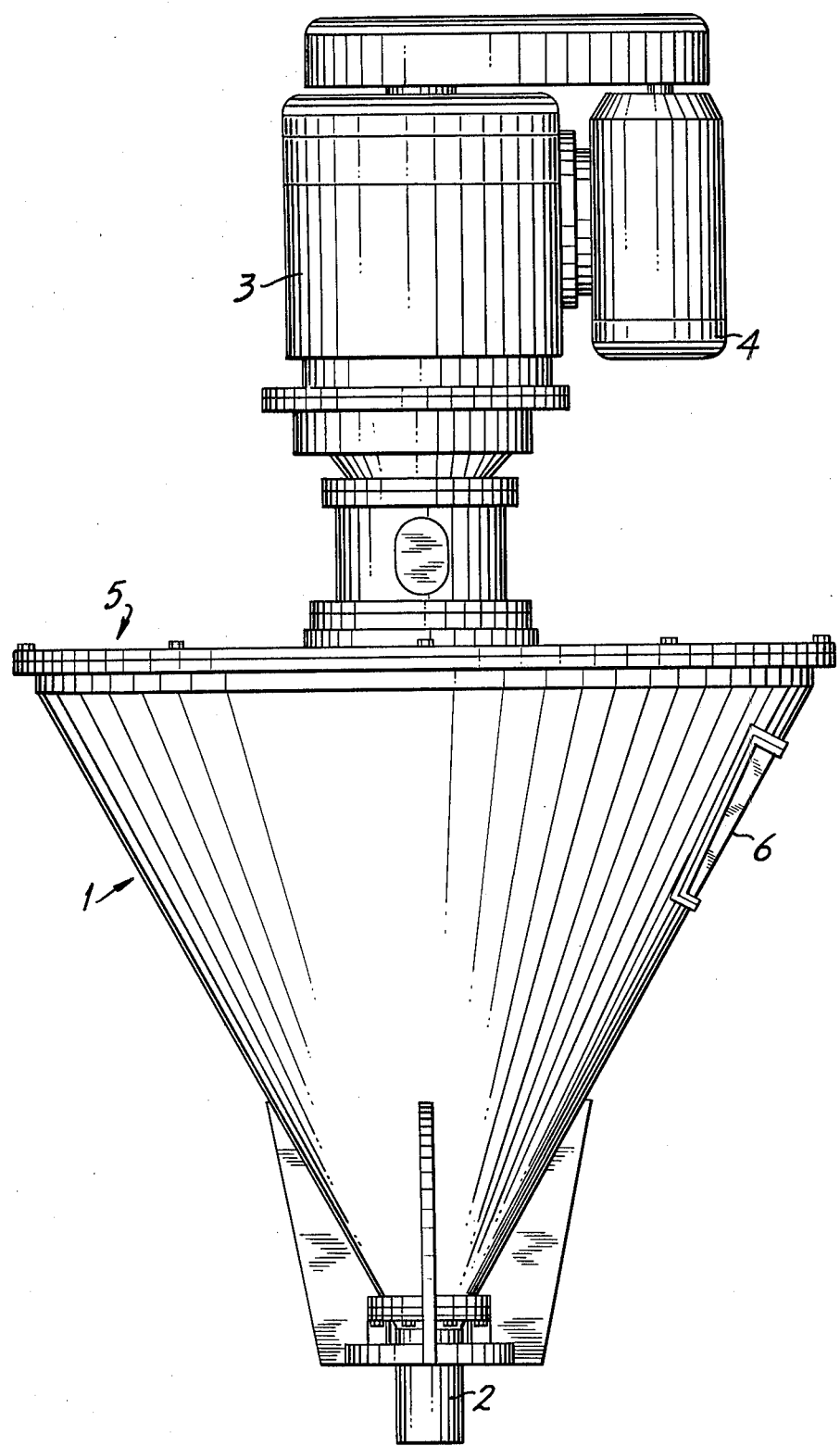
FIG. 1 is an elevational view of a device embodying the present invention.

In FIG. 1 a conical or funnel-shaped housing 1 is shown with its apex directed downwardly. A connecting tube 2 extends downwardly from the lower or apex end of the housing 1 for connection to an extruder, not shown. Above the upper end of the housing, a gear arrangement 3 is positioned along with a drive motor 4. A feed opening 5 is located in the top of the housing 1. Closely below the top, in the conically shaped side of the housing, a control flap 6 is provided which facilitates the control of the processing mechanism within the funnel-shaped housing 1.

Figure 2:
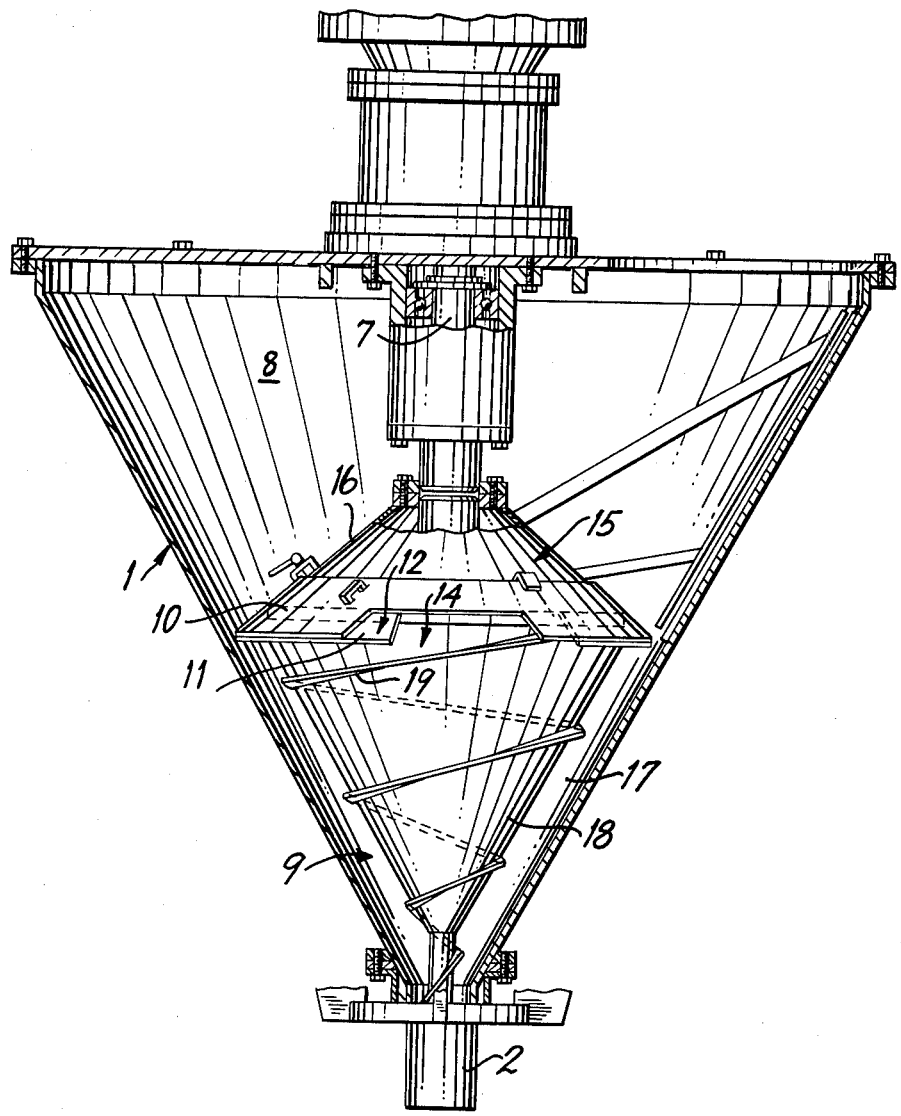
FIG. 2 is a vertical section taken through the device in FIG. 1 and illustrating the essential portion of the device.

FIG. 2 illustrates the interior of the housing 1. A screw shaft 7 extends downwardly from the gear arrangement 3 into the housing and it is supported in appropriate bearings in a manner known in the art. The interior of the housing is divided into two sections or chambers, that is, an upper storage chamber 8 and a lower conveying chamber 9. A frusto-conically shaped partition or closure member 10 and attached segments 11 form, at least in part, the separation of the two chambers. As can be seen in FIG. 2, the frusto-conically shaped partition member 10 is located above the segments 11, and the partition member and segments are rotatable relative to one another. The partition member 10 has openings 12 and the segments 11 are in angularly spaced relation forming openings 14. By relative rotation of the partition member and the segments the openings can be aligned completely or at least in part so that the size of the flow path between the storage chamber 8 and the conveying chamber 9 can be regulated.

Screw shaft 7 extends downwardly through the storage chamber 8 and a hollow body 15 is secured to the shaft. The upper portion 16 of hollow body 15 is conically shaped with its apex directed upwardly, that is, it has an inverted funnel shape. The upper portion 16 forms, in combination with the partition member 10, the lower surface of the storage chamber 8. Due to the downwardly sloping surfaces of the upper portion 16 and the partition member 10, the material is directed from the storage chamber 8 through the openings 12, 14 into an annular conveying passageway or gap 17 in the conveying chamber 9. Hollow body 15 includes a bottom portion 18 projecting downwardly from the lower end of the upper portion. Bottom portion 18 is in the shape of a funnel or cone with its apex directed downwardly in the same manner as the housing. The wall forming the bottom portion 18 is in parallel relation to the wall forming the conically shaped housing so that the annular gap or passageway 17 is formed between the inner surface of the housing and the outer surface of the wall forming the bottom portion 18. Accordingly, the passageway 17 has the same width from the top end to the bottom end of the passageway 17 formed between the housing and the lower portion 18. A screw blade 19 is secured to and extends helically around the bottom portion 18 of the hollow body from the upper end to the lower end of the bottom portion. The screw blade facilitates the movement of the material through the passageway 17 to the connecting tube 2. As can be seen at the lower end of FIG. 2, the screw blade 19 extends from the lower end of the bottom portion 18 into the tube. Within the tube 2 there is no free conveying space between the outer edge of the screw blade 19 and the inner surface of the tube, rather the outer edge of the screw blade is closely adjacent to the tube.

While specific embodiments of the invention have been shown and described in detail to illustrate the application of the inventive principles, it will be understood that the invention may be embodied otherwise without departing from such principles.

What is claimed is:

1. A device for feeding plastics material to an extruder comprising a conically shaped housing with a material outlet opening located at the apex end thereof, motor driven means rotatably mounted within said housing for feeding the material from the material outlet opening in said housing, wherein the improvement comprises that said housing has the apex end thereof directed downwardly, said feeding means comprises a conically shaped wall with the apex end thereof directed downwardly located within and spaced inwardly from the inner surface of said housing, said wall being disposed in parallel relation with the inner surface of said housing and forming therebetween an annular material flow passageway extending downwardly to the outlet opening from said housing, a screw blade secured to and extending around said wall from the upper end to the lower end thereof and said screw blade extending downwardly from the lower end of said wall through said outlet opening, a partition wall in combination with said feeding means divides the interior of said housing into an upper storage chamber and a lower material conveying chamber with said conically shaped wall located within said conveying chamber, said partition wall comprises a frusto-conical member having the surfaces thereof diverging in the downward direction, the circumferentially extending lower end of said frusto-conical member having at least one opening therethrough, and arcuate segments attached to and extending around the circumferentially extending lower end of said frusto-conical member, said segments being spaced apart in the circumferential direction of said frusto-conical member.

2. A device, as set forth in claim 1, wherein said partition member and said segments being rotatable relative to one another for aligning the opening in said member with the opening between adjacent said segments for regulating the flow of material from the storage chamber into the conveying chamber.

3. A device, as set forth in claim 1, wherein said feeding means includes a conically shaped section extending upwardly from the upper end of said conically shaped wall with the apex thereof facing upwardly and with the surface of said section combining with said partition wall for dividing the interior of said housing into said storage chamber and conveying chamber.

4. A device, as set forth in claim 1, wherein a connecting tube is secured to and extends downwardly from the outlet opening from said housing, and said screw blade extends downwardly from said housing into said connecting tube with the radially outer edge disposed closely adjacent the inner surface of said connecting tube so that there is no free flow space therebetween.

* * * * *